United States Patent [19]

Tom

[11] Patent Number: 5,196,871

[45] Date of Patent: Mar. 23, 1993

[54] NOSE BRIDGE PAD

[76] Inventor: Calvin F. Tom, 2445 Newport Ave., Cardiff, Calif. 92007

[21] Appl. No.: 594,331

[22] Filed: Oct. 9, 1990

[51] Int. Cl.⁵ .......................... G02C 5/02; G02C 5/12
[52] U.S. Cl. ..................................... 351/132; 351/139
[58] Field of Search ..................... 351/78, 80, 88, 132, 351/138, 139; 2/446, 445

[56] References Cited

U.S. PATENT DOCUMENTS 3,186,001  5/1965  Roeder ............................... 351/138

FOREIGN PATENT DOCUMENTS 291178  5/1928  United Kingdom ................ 351/139

Primary Examiner—Rodney B. Bovernick

[57] ABSTRACT

In combination, an eyeglass frame with a padded nose bridge region, and also the pad itself with an adhesive coating for attaching to the nose bridge portion of eyeglass frames, to make eyeglasses more comfortable in use, preventing the annoyance of the glasses slipping down the nose, and prevent discomfort to the user's nose and cheeks which would otherwise occur if the glasses are heavy or slightly out of fit.

3 Claims, 1 Drawing Sheet

NOSE BRIDGE PAD

BACKGROUND OF THE INVENTION

Anyone who has worn glasses can testify to the aggravation caused by glasses which are not shaped properly to start with, or become slightly deformed in use so that they bear down on one side or other of the nose bridge and dig into the flesh, causing considerable discomfort. This problem may be more acute with sun glasses because generally speaking sunglasses are not prescription or custom, but come off a rack, making it is very unlikely that they would precisely fit the user's nose.

Most people also know of the annoyance of glasses and sunglasses slipping down on the nose when the plastic surface of the nose bridge area becomes slippery with sweat and natural body oils. This causes the user to constantly push the glasses back up on the nose.

In addition, some people have a very flat nose bridge which will not touch the frame portion above the nose bridge of ordinary frames. This is very typical of orientals. When orientals are fitted with western-style glasses, or when they purchase western-style sun glasses, often the nose bridge will not touch the frame of the glasses at all, so that the frame rests on their cheeks.

This flat nose characteristic also applies to a majority of children. Young children's nose bridges do not develop until they are older, so in addition to their noses being small, this causes the frames to fit improperly and to rest on the cheeks. This occurs with both children's glasses and just about all adult glasses worn by children.

There is a need, therefore for a combination spacer, slippage preventer and nose bridge protector, both in combination with existing glasses frames manufactured as original equipment, and also as an add-on unit which could be adapted to most or all of the styles of glasses frames on the market of the type which do not have individual pads on the ends of metal stems which straddle the nose bridge and ride on the sides of the nose.

SUMMARY OF THE INVENTION

The instant invention fulfills the above stated need and provides an add-on pad for use with the type of eyeglass frames which do not have the individual nose pads, and can also be used on sun glasses. The pad comprises an elongated segment of resilient foam, provided in several, slightly modified embodiments, which preferably has a peel-back adhesive strip on one side to easily bond to the frame portions which straddle the bridge of the nose.

The invention also includes eyeglass frames having a pad in place over the nose bridge region. Such padding provided at the point of manufacture of the frames could be bonded to the hard frame material with a layer of adhesive, or foam could be applied directly to the nose bridge portion of the frame and allowed to dry, adhering directly to the frame material itself, which is usually plastic.

DETAILED DESCRIPTION OF THE PREFERRED EMBODIMENT

Figure 1:
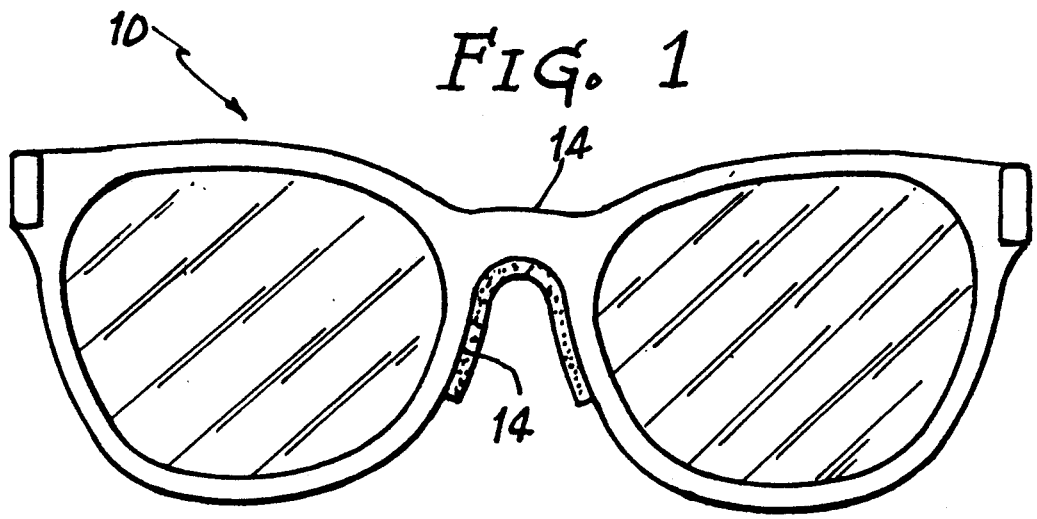
FIG. 1 is a front elevation view of the invention in use, illustrating the pertinent portion of the eyeglass frame to which it attaches.

The pertinent portion of an eyeglass frame is indicated at 10 in FIG. 1. It should be noted that this frame is one of two basic types of frames that are in common use today. The other kind, generally used with wire frame glasses, rests on the sides of the nose by means of little feet or pads which connect by curved metal stalks to the rest of the frame. These little pads are generally hard, transparent plastic. There are little foam pads on the market that adhere to the plastic pads to protect the nose from irritation. Frames of this kind are not treated in the instant invention.

The frames pertinent to the instant invention have a central bridge portion having sides 12 and a top portion 14. Typically, when wearing these frames, both the sides and the top portion 14 contact and are supported by the flesh of the nose. Because the frames are rigid, discomfort can be caused if the frames are not properly contoured, or if they are not bent to the precise shape of the wearer.

To counter this, the invention comprises an elongated segment 16 of soft, resilient and preferably closed-celled foam. The soft foam is not only soft and comfortable, but also provides a non-skid surface for the nose bridge. This foam could be glued or bonded to the frame with any suitable cement composition, but in the preferred embodiment the segment has a layer of press-on contact cement 18 covered by a strip of peel-off tape 20 to permit the segment to be easily installed on a pair of eyeglasses.

Figure 2:
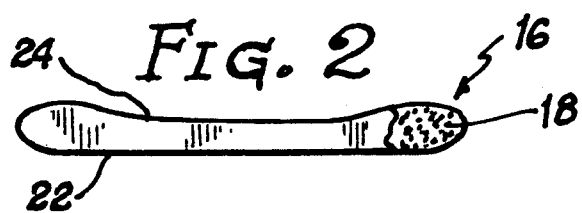
FIG. 2 is a top plan view of a first embodiment of the invention.
Figure 3:
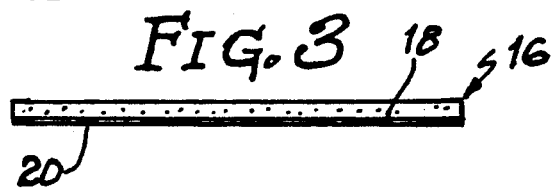
FIG. 3 is a side elevation view of the invention as shown in FIGS. 2, 4 and 5.
Figure 4:
FIG. 4 is a slightly modified configuration of the invention.
Figure 5:
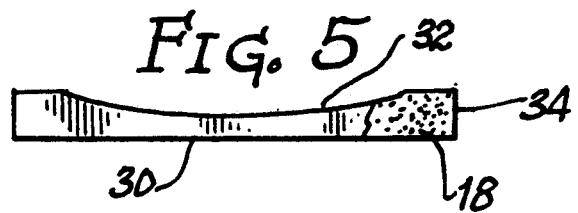
FIG. 5 is a yet another slightly modified plan form configuration of the invention.

The planform contour of the segment is subject to some variation, three examples of which are shown in FIGS. 2, 4 and 5. In FIG. 2, the segment has a flat side edge 22 and a concave side edge 24. The flat side edge 22 would enable the pieces to be cut somewhat more efficiently from a single panel of flat foam stock. Because of the resilient and flexible nature of the foam, when it is applied to the glasses the straightness of the one side would not be noticed.

FIG. 4 illustrates more of a dumbbell- shaped embodiment, with two concave side edges 26 and rounded tips 28. FIG. 5 is yet another embodiment having a flat side 30, a concave side 32, and squared-off ends 34. The squared-off ends might appeal to some more than the rounded tips, and would present a slightly more economical profile from a manufacturing standpoint.

Of course, the frames could be provided with the segment already in place as shown in FIG. 1. In any of the embodiments, the invention could add a stylish twist to a functional addition to conventional eyeglass frames. In addition to the padding for the protection of the nose surfaces, the segment provides enough bulk in the upper portion 14 of the frame bridge area that it will rest atop the nose bridge of most orientals and children, and lift the frame off of the cheeks.

It is hereby claimed:

1. A nose bridge protector for attaching to an eyeglass nose bridge on a pair of eyeglasses having a frame and a saddle type bridge comprising:

(a) an elongated segment of resilient foam wherein said segment has two opposite long sides edges, one of which is straight and the other being concave;
(b) said segment being expanded at its ends to form widened pad portions and having a narrower central bridge portion; and
(c) one of the surfaces of the segment having means to bond said segment to the eyeglass nose bridge;

said protector being sized to contact and protect the bridge and sides of the wearer's nose when adhered to the eyeglass nose bridge.

2. Structure according to claim 1 wherein said segment has straight-cut ends substantially perpendicular to said straight side edge.

3. Structure according to claim 1 wherein said segment has rounded ends.

* * * * *